(12) United States Patent
Polke

(10) Patent No.: US 7,806,455 B2
(45) Date of Patent: Oct. 5, 2010

(54) PLASTIC EDGE SEALING STRIP AND MOUNTING HEAD

(75) Inventor: Siegbert Polke, Michelau (DE)

(73) Assignee: Kunststoff-Technik Scherer & Trier GmbH & Co KG, Michelau (DE)

( * ) Notice: Subject to any disclaimer, the term of this patent is extended or adjusted under 35 U.S.C. 154(b) by 0 days.

(21) Appl. No.: 11/631,329

(22) PCT Filed: Jun. 29, 2005

(86) PCT No.: PCT/EP2005/006999

§ 371 (c)(1),
(2), (4) Date: Jan. 3, 2007

(87) PCT Pub. No.: WO2006/002891

PCT Pub. Date: Jan. 12, 2006

(65) Prior Publication Data

US 2007/0246966 A1 Oct. 25, 2007

(30) Foreign Application Priority Data

Jul. 2, 2004 (DE) .................. 10 2004 032 217

(51) Int. Cl.
*B60J 1/02* (2006.01)
(52) U.S. Cl. ........................................ 296/93
(58) Field of Classification Search ............... 296/93, 296/84.1, 201; 156/552; 425/505
See application file for complete search history.

(56) References Cited

U.S. PATENT DOCUMENTS

| | | | |
|---|---|---|---|
| 1,875,728 A | | 9/1932 | Frederick |
| 4,858,988 A | * | 8/1989 | Morgan et al. ............... 296/201 |
| 5,176,420 A | * | 1/1993 | Kato ........................... 296/93 |
| 5,354,410 A | * | 10/1994 | Cohen et al. ................. 156/552 |
| 6,460,300 B2 | * | 10/2002 | Mikkaichi et al. ......... 52/204.597 |
| 6,617,015 B2 | * | 9/2003 | Rood ....................... 428/304.4 |
| 6,698,489 B1 | * | 3/2004 | Shinozaki et al. ............. 156/574 |
| 6,748,993 B1 | * | 6/2004 | Shinozaki et al. ............. 156/391 |
| 6,769,700 B2 | * | 8/2004 | Ortmuller et al. ............. 277/642 |
| 6,830,288 B2 | * | 12/2004 | Eynon et al. ................. 296/192 |
| 7,073,293 B2 | * | 7/2006 | Galer .......................... 49/413 |
| 2007/0074821 A1 | * | 4/2007 | Ikishima et al. .............. 156/543 |

FOREIGN PATENT DOCUMENTS

| | | |
|---|---|---|
| DE | 36 40 889 A1 | 6/1988 |
| DE | 103 22 637 A1 | 12/2004 |

(Continued)

*Primary Examiner*—Joseph D Pape
(74) *Attorney, Agent, or Firm*—Rothwell, Figg, Ernst and Manbeck, P.C.

(57) ABSTRACT

A plastic edge sealing strip (10), which can be inserted between a vehicle window (26) and a cooling water reservoir covering, comprises a spring limb (14) and a main limb (12) between which a detent element (40) of the cooling water reservoir covering can be inserted in an arrested manner, and comprises a contact limb (16) for resting against the inner surface (32) of the vehicle window. The main limb (12) can be adhered in a sealing manner to a narrow side (34) of the vehicle window (26) by mean of a contact hot-melt adhesive (28). The edge sealing strip (10) has a soft metal-like bending behavior that enables a simple mounting by means of an associated mounting head (100).

24 Claims, 7 Drawing Sheets

FOREIGN PATENT DOCUMENTS

| | | |
|---|---|---|
| EP | 0 249 560 A | 12/1987 |
| EP | 0 721 856 A2 | 7/1996 |
| EP | 1 361 098 A | 11/2003 |
| JP | 57209420 * | 12/1982 ................. 296/201 |
| WO | WO 00/03885 A | 1/2000 |
| WO | WO 01/85481 A | 11/2001 |
| WO | WO 03/008222 A | 1/2003 |

\* cited by examiner

PLASTIC EDGE SEALING STRIP AND MOUNTING HEAD

CROSS REFERENCE TO RELATED APPLICATION

This application is a 35 USC §371 National Phase Entry Application from PCT/EP2005/006999, filed Jun. 29, 2005, and designating the United States.

The invention relates to a plastic edge sealing strip which can be arranged, in particular, between the lower edge of a motor vehicle windscreen and a cooling water reservoir covering and to which a detent element of a cooling water reservoir covering can be locked.

The lower edge of a motor vehicle windscreen extends, following a window, in a three-dimensional form. The plastic edge sealing strip must therefore also extend so as to bend three-dimensionally without stresses, emanating from the plastic edge sealing strip, being transmitted to the pane of glass. Stresses acting on the motor vehicle windscreen cause, at least over time, the plastic edge sealing strip to become detached from the motor vehicle windscreen. If the plastic edge sealing strip is not detached, the motor vehicle windscreen can even shatter.

An edge sealing strip of this type, also known as a windscreen border profile, is known. In this case, a spring limb of a profile member, which is hook-shaped in cross section, can be locked in a sealing manner to a rib of a cooling water reservoir covering, and the profile member, made from hard plastics material, comprises a sealing lip which is made from correspondingly soft plastics material and is arranged between the lower rim of the window and the upper edge of the cooling water reservoir covering. The profile member is provided with a clamping force-increasing metal insert which generally follows the hook shape of the profile member.

Systems of this type are relatively rigid and therefore have to be three-dimensionally pre-bent in order to minimize the deviations from the contour of the window. In order to minimize recoil of the bent strip, said strip is to be stretch-bent; however, this requires a complex bending device and an additional operation. In many cases, this is therefore omitted, resulting in non-stress-free fitting.

It is therefore an object of the invention to provide a plastic edge sealing strip which facilitates simple and stress-free fitting of the plastic edge sealing strip to a vehicle window.

In order to achieve this object, the invention provides a plastic edge sealing strip according to the preamble of claim 1, which strip displays soft metal-like bending behaviour.

As a result of its soft metal-like bending behaviour, the edge sealing strip is at least substantially inelastically deformable, thus allowing, in contrast to edge sealing strips known in the prior art, stress-free fitting of the edge sealing strip to a vehicle window even without precise three-dimensional pre-bending. The requisite bending forces are relatively low, even if the contour of the window is non-uniform, so even manual fitting without pre-bending of the edge sealing strip, most preferably using the fitting head according to the invention, is possible.

Provision may be made for the plastics material of the edge sealing strip to be reinforced, at least in certain regions, with an active filler which influences the material properties. The filler can be fibrous (for example, glass or mineral fibre) or platelike (for example, talc) in its composition. The proportion by weight of the filler can in this case be between 10 and 40%, more preferably between 15 and 30%, most preferably approximately 20%.

The filler reinforcement of the half-hard plastics material causes the soft metal-like behaviour, wherein it is assumed that this is due to the fact that, in the event of elongation of a region of the volume of the strip caused by bending, the microchannels surrounding the filler fibres or platelets are extended accordingly but shrink back inward on account of the resilient recoil of the plastics material into the portions protruding beyond the ends of the fibres. If the bending process is terminated, the resilient recoil into these regions is substantially prevented in that the filler fibres or platelets are no longer able to enter the contracted end portions.

In addition, the filler-reinforced plastics material displays almost identical thermal expansion behaviour as the clamping force-increasing metal insert, so the sealing strip according to the invention preserves its shape even in the event of changes in temperature. This is in marked contrast to the known sealing strip in which changes in temperature lead to bimetal-like deformation of the strip or to the build-up of stresses when the strip is fitted. These stresses can damage the edges of the pane of glass (breaking-out of the edges of the window).

The filler-reinforced plastics material may in this regard preferably be formed from a thermoplastic, most preferably PVC. The plastics material of the edge sealing strip can in this case be, at least in certain regions, half-hard, i.e. having a Shore (A) hardness of 70 to a Shore (D) hardness of 75, more preferably having a Shore (D) hardness of from 40 to 70, most preferably having a Shore (D) hardness of approximately 60, measured to DIN EN ISO 750 868.

The clamping force-increasing metal insert can comprise a preferably roll-deformed aluminum or steel profile. Provision may also be made for the clamping force-increasing metal insert to be formed from an at least approximately U-shaped profile connecting the spring limb to the main limb, so the contact limb is constructed substantially without the clamping force-increasing metal insert. As a result of this geometry, the contact limb, which is located in the bending plane and is therefore particularly critical to bending, and the contact face of which is intended to rest substantially without stress against the inner surface of the vehicle window, is substantially more easily bendable, and this facilitates fitting. At the same time, the clamping force-increasing metal insert permanently guarantees the clamping force once the detent element has been received between the spring limb and main limb.

Provision may also be made for the contact limb to be constructed, at least over a portion of the length of the edge sealing strip, with material weakenings, preferably edge recesses. The contact limb can in this case be punched out, for example in a tooth-shaped configuration, in order to increase the flexibility of the profile. The contact limb can also be provided, on its side remote from the vehicle window, with at least one, preferably substantially hook-shaped, moulding for positive connection to a curable window adhesive on the inner surface of the vehicle window. This moulding provides additional stability of the connection of the edge sealing strip to the vehicle window and optionally the bodywork. The contact limb is in this case initially adhered to the inner surface of the window using double-sided adhesive tape, so the edge sealing strip is rigidly connected to the inner surface of the vehicle window during curing of the window adhesive, and pressing of the sealing strip against the vehicle window until the window adhesive has completely cured can therefore be dispensed with.

For safety reasons, vehicle windows are in most cases of multilayered construction (for example, a composite pane of glass), there being arranged in many cases between two window layers a plastic film layer which ensures, in the event of an object or a body part striking the window, that the window fragments do not disperse. In the case of known edge sealing strips, such as for example the edge sealing strip described at the outset, the window is sealed against the ingress of water by a sealing lip acting, in the rim region between the narrow side and outer surface, on the narrow side in a sealing manner. However, the sealing effect is not ensured under all circumstances, so water is able to infiltrate and may even seep between the layers of the multilayered window pane. This may damage the vehicle window.

In order to improve the seal, it is also proposed, in the case of a plastic edge sealing strip of the type described hereinbefore, for the main limb to be provided on the side of the vehicle window with a preferably permanently adhering and non-curing window perimeter adhesive for adhesive connection to the narrow side of the vehicle window. The window perimeter adhesive not only prevents infiltration of water into the region between the strip and window but also protects the windows against the infiltration of moisture between the layers. This solution can therefore also be used generally for edge sealing strips comprising a main limb, spring limb and contact limb which do not display any soft metal-type bending behaviour.

The window perimeter adhesive can comprise a contact hot-melt adhesive, i.e. a non-curing and permanently adhering adhesive which is applied under the influence of heat when the profile is produced. The adhesive is compressed during fitting and flows under the influence of pressure and time, so it reliably covers the narrow side, in particular in the region of the parting planes between the layers, and may even infiltrate slightly between the layers and thus provide reliable insulation against the infiltration of water but also of air.

The window perimeter adhesive can also be provided toward the outer surface of the vehicle window with a covering which ensures, when the sealing strip is fitted to the window, that the window perimeter adhesive is distributed onto the two thirds of the narrow side of the window facing the inner surface of the window and prevents the adhesive from seeping out toward the outside of the window. Small traces of adhesive can therefore be seen on the outside of the window. This covering also protects a contact adhesive which may be used during handling and transportation of the sealing strip.

There may further be provided, in the region between the spring limb and main limb, preferably in the connecting region of both limbs, a detent element adhesive. There may also be provided, on the spring limb and/or on the main limb, a preferably soft plastic knob for detachable fixing of the inserted detent element of the connection part. Both the detent element adhesive and the plastic knob can in this case cause additional sealing of the detent element.

In order to obtain a fitting head which facilitates simple and stress-free fitting of a plastic edge sealing strip, preferably but not necessarily of the type described hereinbefore, to a vehicle window, the invention further proposes a fitting head for attaching a plastic edge sealing strip, in particular an edge sealing strip as described hereinbefore, to the edge of a vehicle window, in particular to the lower edge of a motor vehicle windscreen, comprising:

an insertion slot both for the edge sealing strip and for an edge region of the vehicle window, a spacer in the region of the edge sealing strip insertion side of the insertion slot, to hold a contact limb, provided with a window adhesive, of the edge sealing strip at a distance from an inner surface of the vehicle window, and a pressing means, following the spacer, for pressing the contact limb against the inner surface of the vehicle window in a pressing position of the pressing means.

A fitting head of this type is suitable for manually fitting an edge sealing strip to the lower edge of a vehicle window, thus obviating the need for a complex fitting station involving a multiple-stage sequence of operations. In conjunction with an edge sealing strip according to the invention displaying soft metal-like bending behaviour, complex three-dimensional pre-bending of the edge sealing strip can also be dispensed with so, depending on the curve of the window onto which the edge strip is to be applied, the sealing strip can either be pre-bent merely two-dimensionally or supplied as a straight part without the need for special packaging and with reduced carriage costs. The bending and fitting process can be carried out in an efficient manner directly at the vehicle window manufacturer's.

In the case of the fitting head, the pressing means can be adjustable between the pressing position and a retracted position. This adjustability of the pressing means facilitates the fitting of the edge sealing strip, as the vehicle window and the edge sealing strip cannot be positioned in the fitting head until the start of the fitting process, without the edge sealing strip becoming stuck in an undesirable manner to the vehicle window.

Furthermore, the pressing means can comprise a pressure roll. The pressure roll can in this case be rotatably mounted on an eccentric part or fastened to a linear adjustment mechanism, both of which can be provided with a hand lever. The pressure roll can also be resiliently mounted so as to be biased into the pressing position. Alternatively or additionally, it can be formed from resilient material. This measure ensures a defined fitting strip-pressing force.

There may also be provided on the fitting head at least one roller, preferably a plurality of rollers, for resting against the outside, remote from the vehicle window, of the edge sealing strip. These rollers allow the fitting head to be moved along the rim of the vehicle window with low friction, so the edge profile can be bonded continuously to the rim of the window.

There may also be provided, to improve the ergonomics of the fitting head, a handle part, preferably on the side of the fitting head that is remote from the insertion slot. Using this handle part, or else without it, pressure can be exerted toward the rim of the window, thus allowing gap-free or very low-gap fitting of the edge sealing strip to the vehicle window. The compact shape of the fitting head, in particular the small distance between the handle or the user's hand and the rim of the window, prevents in this case undesired tilting of the fitting head.

The present invention will be described hereinafter with reference to the preferred embodiments illustrated in the appended drawings without thereby entailing any limitation. In the drawings.

Figure 1:
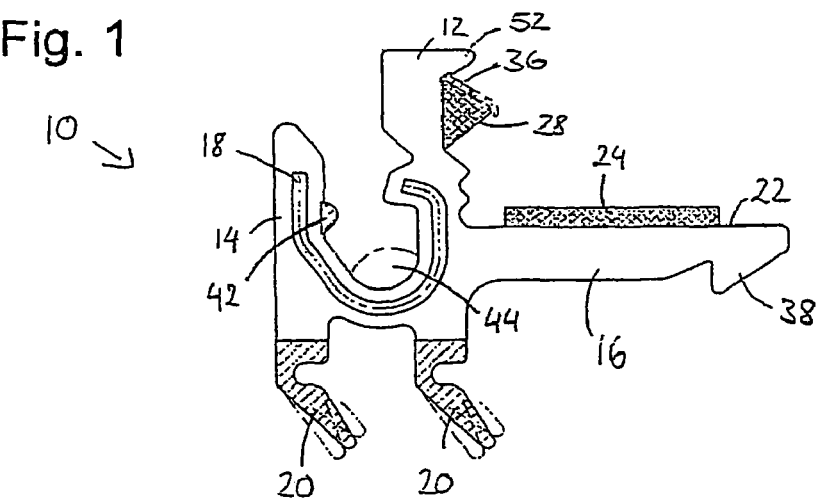
FIG. 1 shows a plastic edge sealing strip according to the invention.

The edge sealing strip 10 shown in FIG. 1 comprises a main limb 12, a spring limb 14 and a contact limb 16 which consists substantially of a filler-reinforced, longitudinally stabilized thermoplastic polymer (for example, glass fibre-reinforced PVC). This plastic is reinforced with filler at a proportion by weight of 20% and has a Shore (D) hardness of 60. The edge sealing strip is produced in an extrusion process in which the filler fibres or platelets are preferably oriented in the direction of extrusion, i.e. in the longitudinal direction of the edge sealing strip 10. This intensifies the soft metal-like bending behaviour of the edge sealing strip during bending about an axis perpendicular to the direction of extrusion. As the curvature of the rim of the window extends substantially about an axis of this type, this effect is advantageous for stress-free fitting of the edge sealing strip 10.

A clamping force-increasing metal insert 18, which is U-shaped in cross section and consists of a roll-deformed aluminum profile, extends into the main limb 12 and the spring limb 14. The contact limb 16 is therefore not provided with a clamping force-increasing metal insert. Resilient sealing lips 20 for supporting and sealing the edge sealing strip on a bodywork 48 (see FIG. 2) of a vehicle are provided in the connecting region of the main limb 12 and spring limb 14 and can be used as a support for the assembly of the window 26 and edge sealing strip 10 on the bodywork 48.

Figure 2:
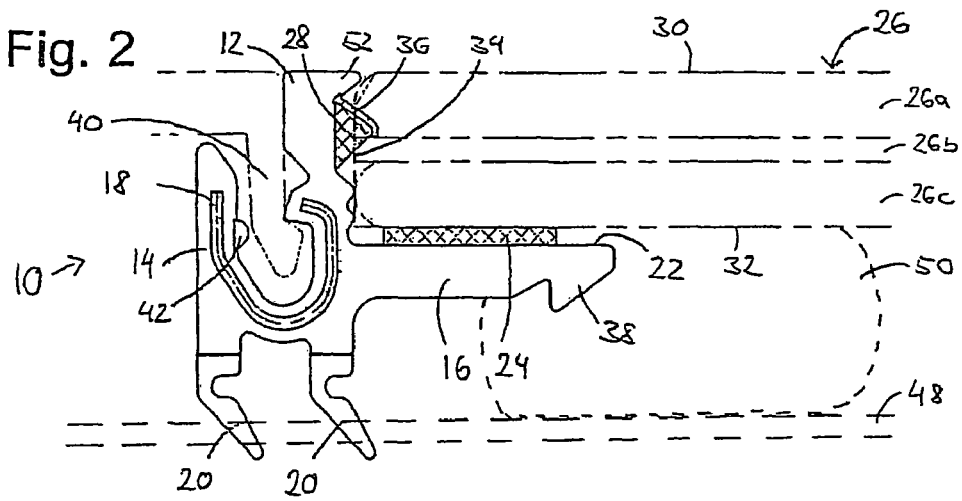
FIG. 2 shows the edge sealing strip from FIG. 1 fitted between a vehicle window and a cooling water reservoir covering.

Attached to a contact face 22 of the contact limb 16 is a double-sided adhesive tape 24 for bonding the edge sealing strip to a vehicle window 26, as shown in FIG. 2. The vehicle window, for example a windscreen, consists of three layers 26a, 26b, 26c, an upper glass pane 26a and a lower glass pane 26c being connected using a plastic film 26b which, in the event of the window shattering, prevents the window fragments from dispersing and thus reduces the risk of injury to the driver and passengers of the vehicle.

Attached to the side of the main limb 12 that faces the vehicle window is a window perimeter adhesive 28 for connecting the edge sealing strip 10 to a narrow side 34 of the vehicle window 26, which narrow side connects the outer surface 30 and the inner surface 32 of the vehicle window 26. The window perimeter adhesive 28 is preferably a permanently adhering contact hot-melt adhesive. Alternatively, a contact adhesive such as, for example, PU adhesive or butyl can also be provided. If a contact hot-melt adhesive is used, the adhesive can partially infiltrate the gaps between the layers 26a, 26b, 26c of the vehicle window 26, thus sealing said window against the ingress of water. A covering 36 is provided to prevent the window perimeter adhesive 28 from issuing toward the outer surface 30 of the vehicle window 26. This covering 36 can, as indicated in FIG. 1, also be shortened in order to facilitate the infiltration of the contact hot-melt adhesive into the gaps between the layers 26a, 26b, 26c of the vehicle window 26.

For improved flexibility, the contact limb 16 can be provided with recesses (not shown) on its outer edge, for example with tooth-shaped punched-out portions. These punched-out portions increase the flexibility of the contact limb 16 and therefore facilitate fitting of the edge sealing strip 10 to the vehicle window 26. The double-sided adhesive tape 24 is in this case not attached until the tooth-shaped punched-out portions have been formed in the contact face 22. The contact limb 16 is provided, at its end remote from the main limb, with a hook-shaped moulding 38 which enters into positive connection with a curable window adhesive 50 (indicated in FIG. 2) which can be attached to the inner surface 32 of the vehicle window 26.

As shown in FIG. 2, a detent element 40 of a cooling water reservoir covering (not shown in detail) engages in the region between the spring limb 14 and main limb 12. A plastic knob 42, which is preferably but not necessarily soft and the cross section of which can be adjusted, provides in this case detachable fixing of the detent element 40 between the spring limb 14 and main limb 12 of the edge sealing strip.

A projection 52 of the edge sealing strip 10, which, after fitting, rests against a chamfer in the rim the connecting the outer surface 30 and the narrow side 84 of the vehicle window 26, provides a flush, continuously planar transition from the vehicle window outer surface 30 to the end face of the edge sealing strip main limb 12. The outer surface of the cooling water reservoir covering is shaped in such a way that it also connects to this continuous plane, so the visible outer surface of the vehicle window 26, edge sealing strip 10 and cooling water reservoir covering forms a continuous surface with only small gaps between the individual elements.

As indicated in FIG. 1, there may be provided a detent element adhesive 44 which seals and additionally connects the detent element 42 to the edge sealing strip 10.

Figure 3:
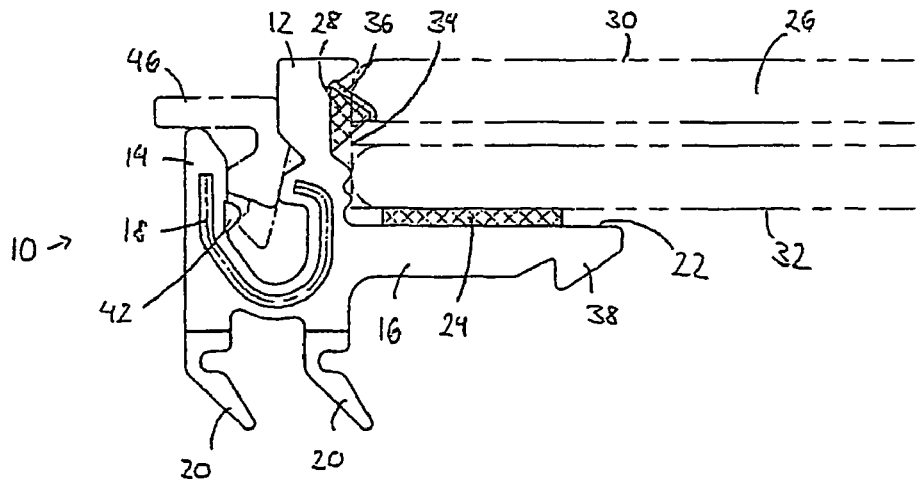
FIG. 3 shows the edge sealing strip from FIG. 1 after fitting to the vehicle window, with a weatherstrip inserted between the spring limb and main limb of the edge sealing strip.

FIG. 3 shows a weatherstrip 46, illustrating two possible configurations of the element engaging between the spring limb 14 and main limb 12. This purpose of the weatherstrip 46 is to keep the distance between the main limb 12 and the spring limb 14 constant during bending of the edge sealing strip 10, i.e. either during pre-bending in accordance with the contour of the window or during the fitting of the edge sealing strip 10 to the vehicle window 26 using the fitting head according to the invention.

The weatherstrip 46 is removed from the edge sealing strip 10 prior to fitting of the detent element 40 of the cooling water reservoir covering. This allows the detent element 40 of the cooling water reservoir covering to be engaged precisely between the spring limb 14 and main limb 12 despite the deformation of the edge sealing strip 10 in accordance with the contour of the window.

Figure 4:
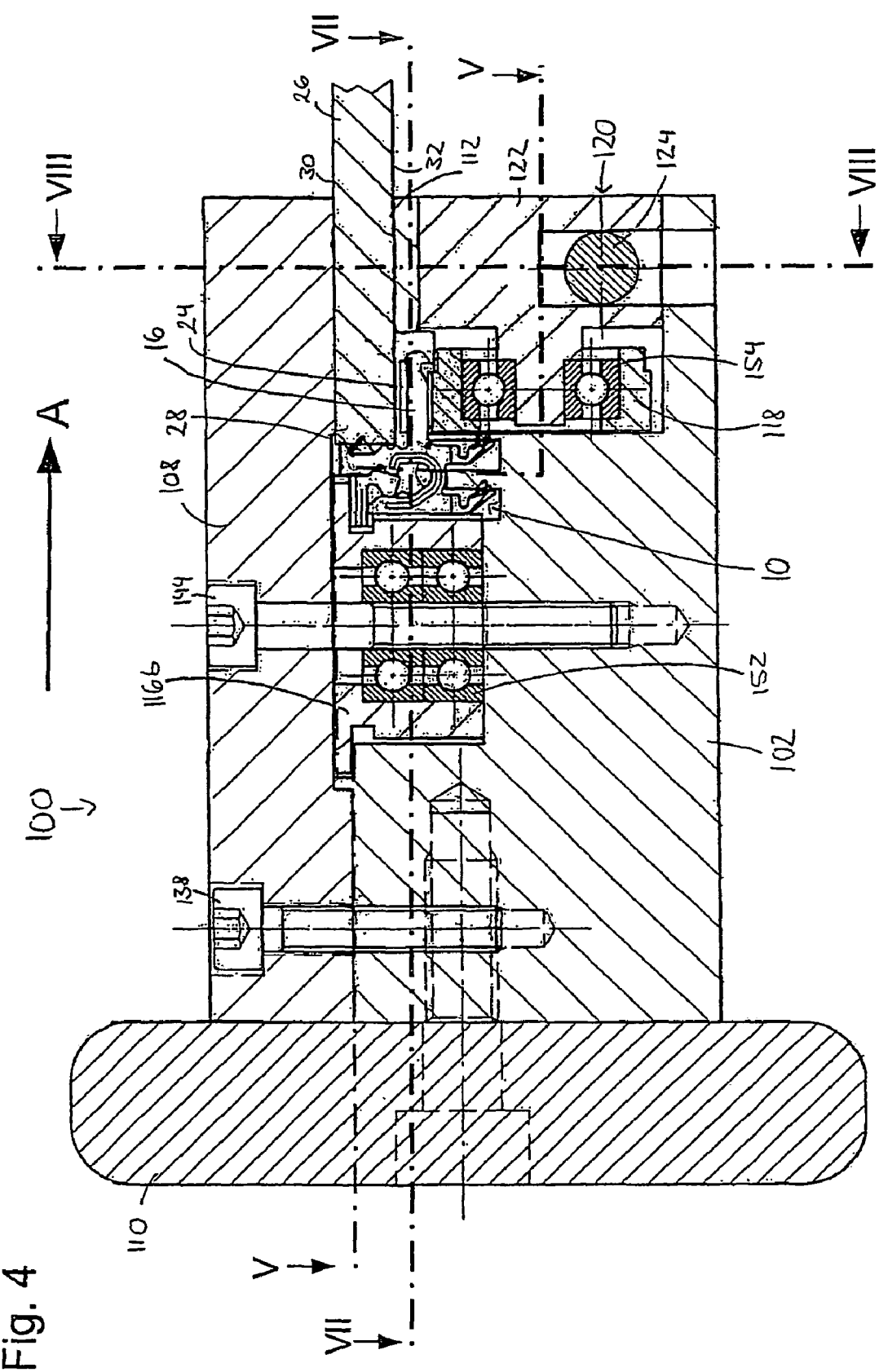
FIG. 4 is a lateral cross section of the fitting head according to the invention.
Figure 5:
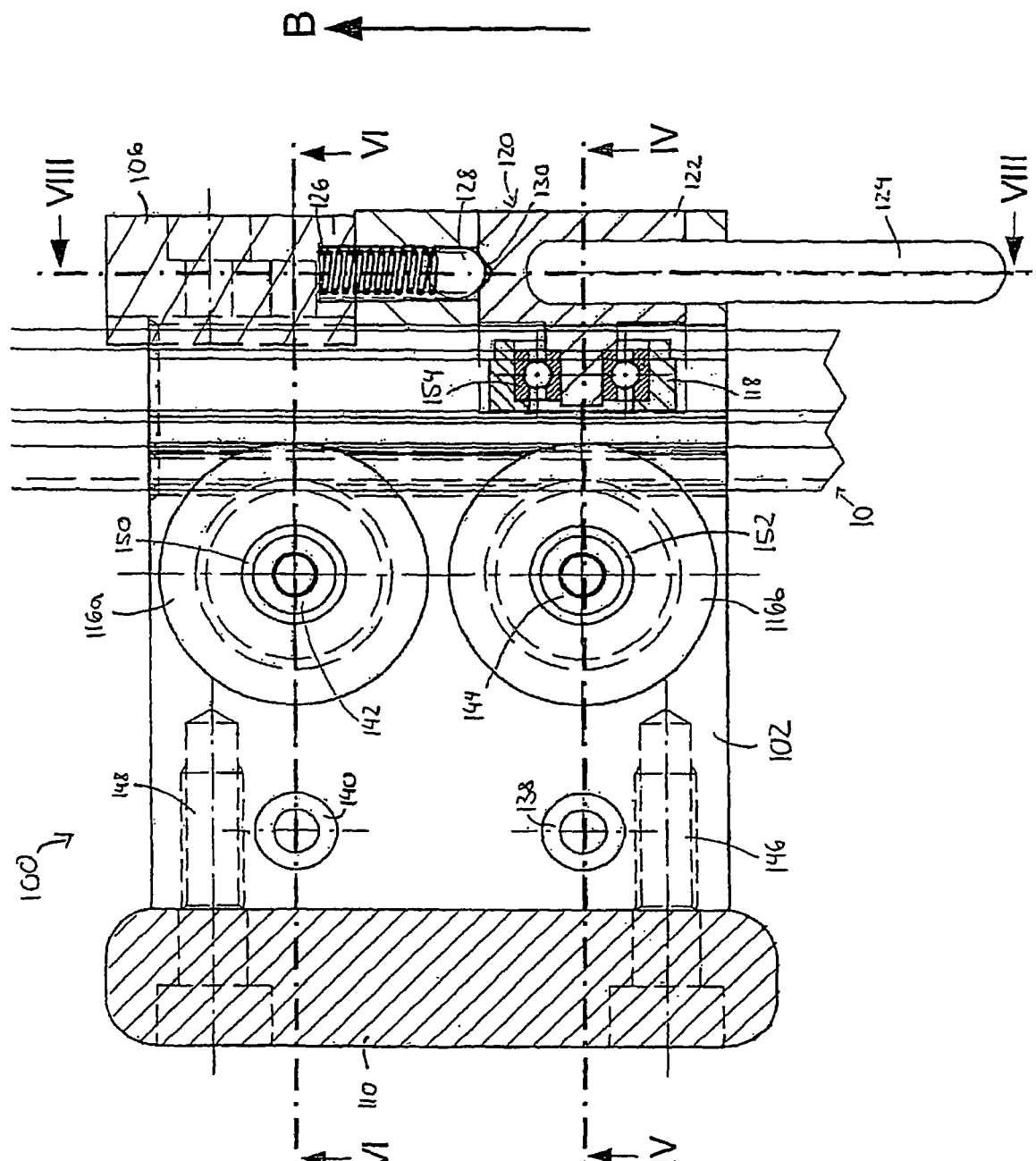
FIG. 5 is a cross section along the line V-V in FIG. 4.
Figure 7:
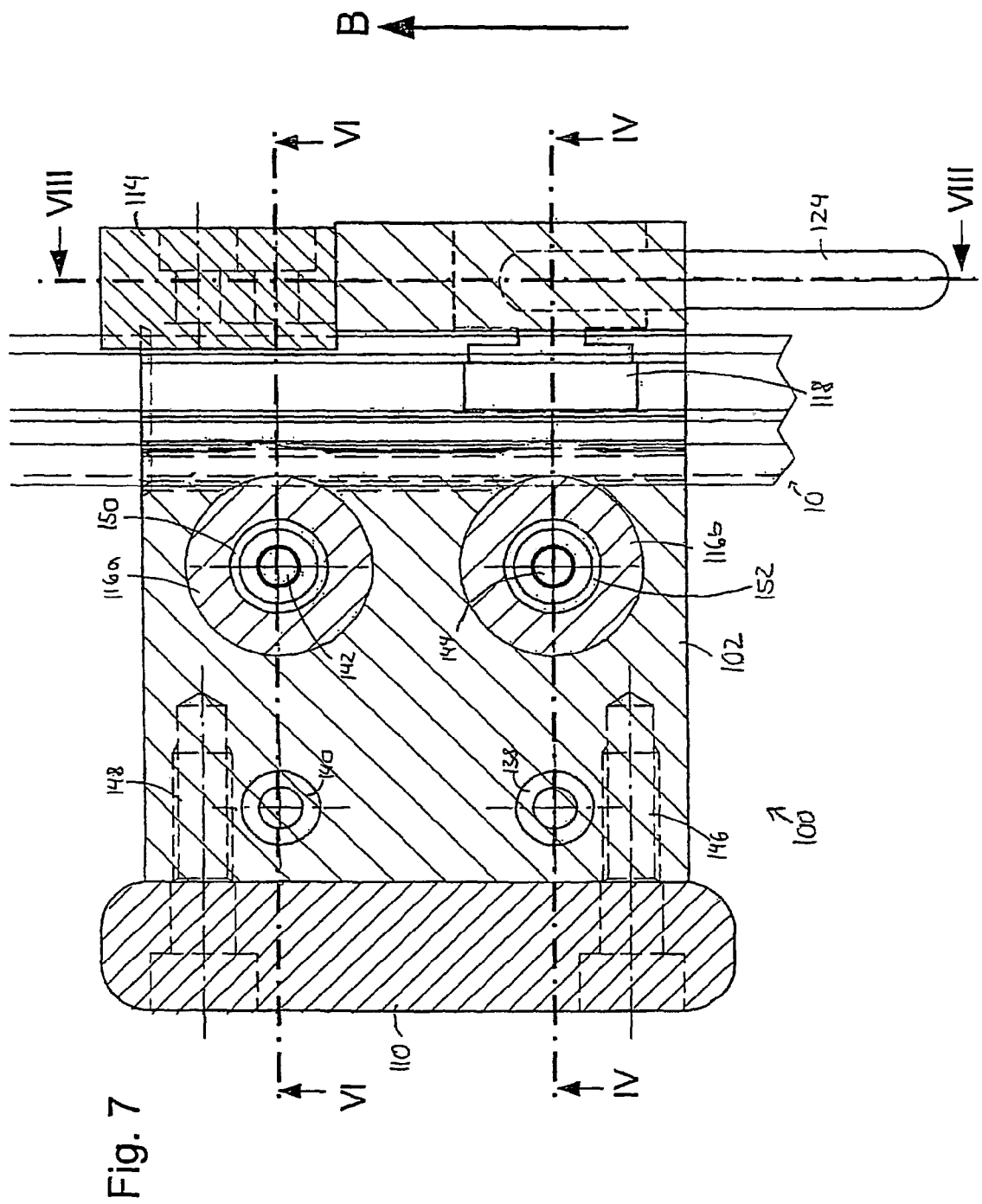
FIG. 7 is a cross section along the line VII-VII in FIG. 4.
Figure 8:
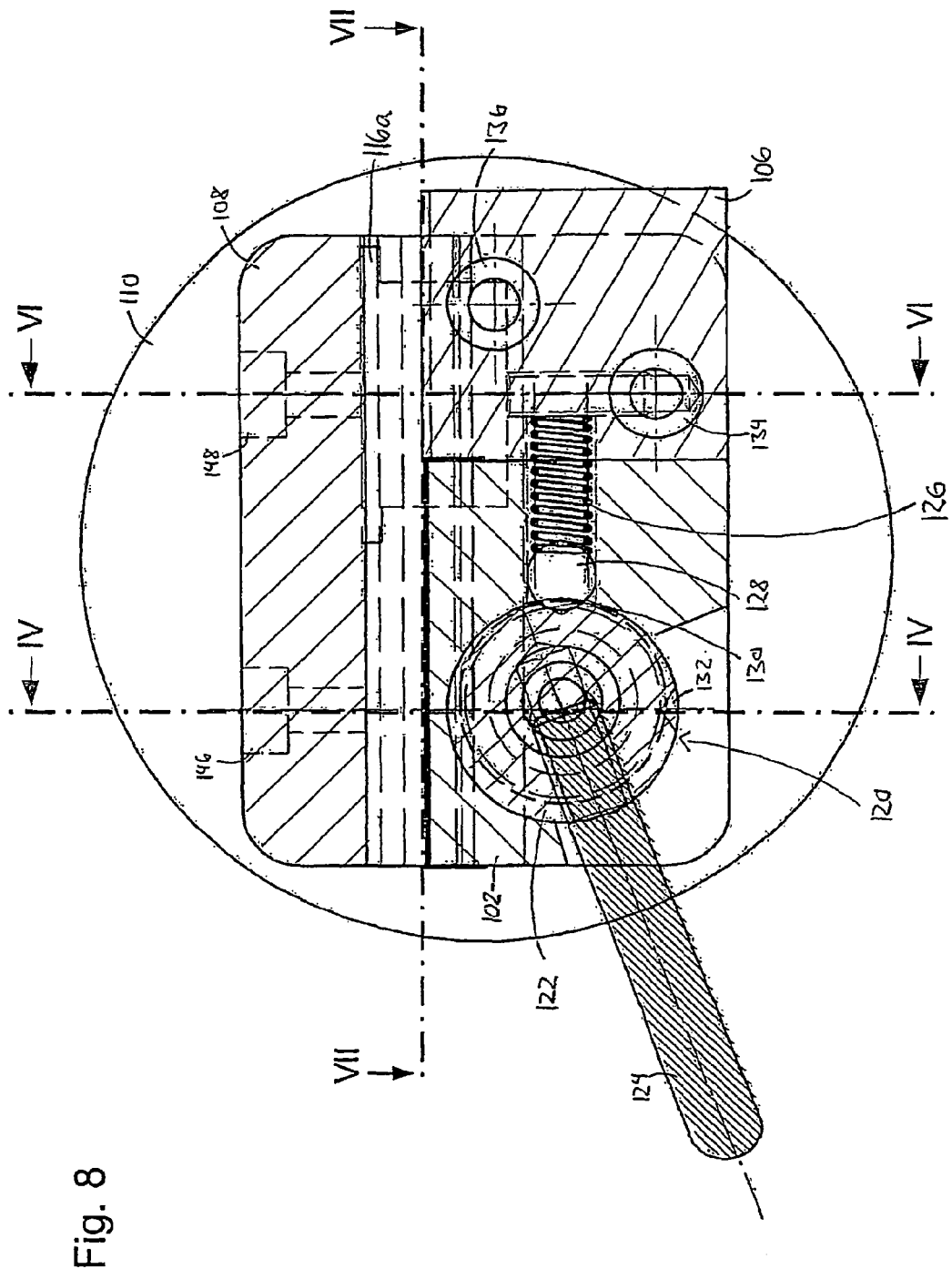
FIG. 8 is a cross section along the line VIII-VIII in FIG. 4.

FIG. 4 shows a fitting head 100 according to the invention comprising a main part 102, an end part 106 (as shown in FIG. 5) and a cover 108. The end part 106 is, as illustrated in FIG. 8, connected to the main part 102 by bolts 134 and 136. The cover 108 is, as illustrated in FIGS. 5 and 7, connected to the main part 102 by bolts 138, 140, 142 and 144. Provided at the end of the fitting head 100 that is remote from the vehicle window 26 is a handle 110 which is connected to the main part 102 using screws 146 and 148 indicated in FIGS. 5 and 7.

Figure 6:
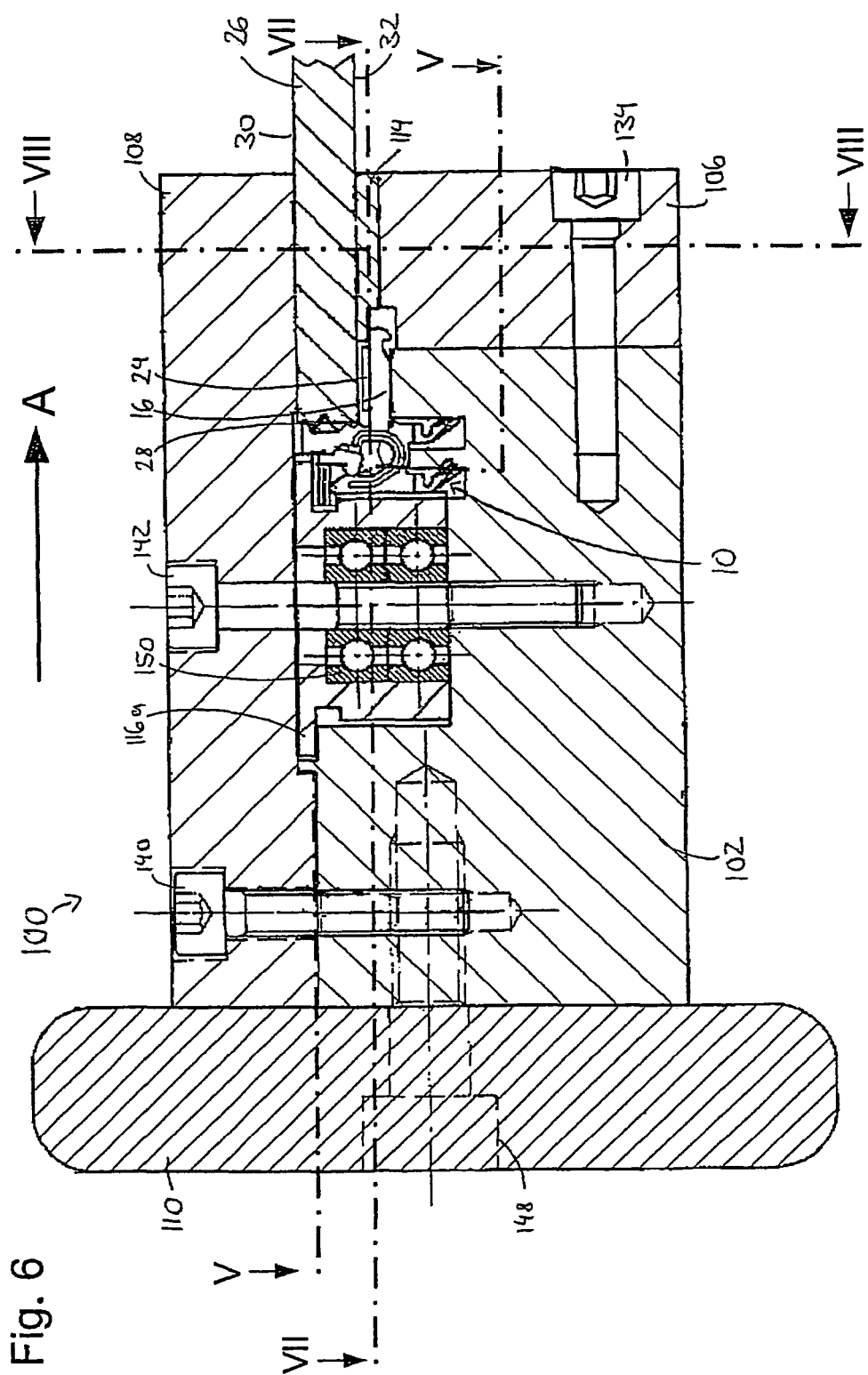
FIG. 6 is a cross section along the line VI-VI in FIG. 5.

There is provided in accordance with the sectional geometry of the edge sealing strip an insertion slot 112 into which an edge sealing strip 110 can be introduced and which can be attached, by movement of the fitting head 100 in the direction A shown in FIGS. 4 and 6, to the lower edge of a vehicle window 26 in order then to be moved in the direction of movement B shown in FIG. 5. The edge sealing strip 10 is thus continuously fastened to the edge of the vehicle window while the fitting head passes by.

There is provided, at an insertion end, advancing in the direction of movement B, of the fitting head 100, a spacer 114 which holds in the insertion region the spring limb 16 and thus the double-sided adhesive tape 24 at a distance from the inner surface 32 of the vehicle window 26 in order to prevent undesired adhesion at this location. In the insertion region, the edge sealing strip 10 is not yet correctly positioned in relation to the rim of the window, so adhesion between the edge sealing strip 10 and the vehicle window 26 in this region would lead to fitting with imprecise fit or to material stresses in the sealing strip 10.

As shown in FIGS. 5 and 7, a first roller 116a and a second roller 116b rest against the side of the edge sealing strip 110 that is remote from the vehicle window 26 in such a way that the fitting head 100 can be moved with low friction along the lower edge of a vehicle window 26 in the direction of movement B indicated in FIG. 5. The rollers 116a and 116b are in this case each rotatably mounted on the bolts 142 and 144 using ball or sliding bearings 150 and 152.

Figure 9:
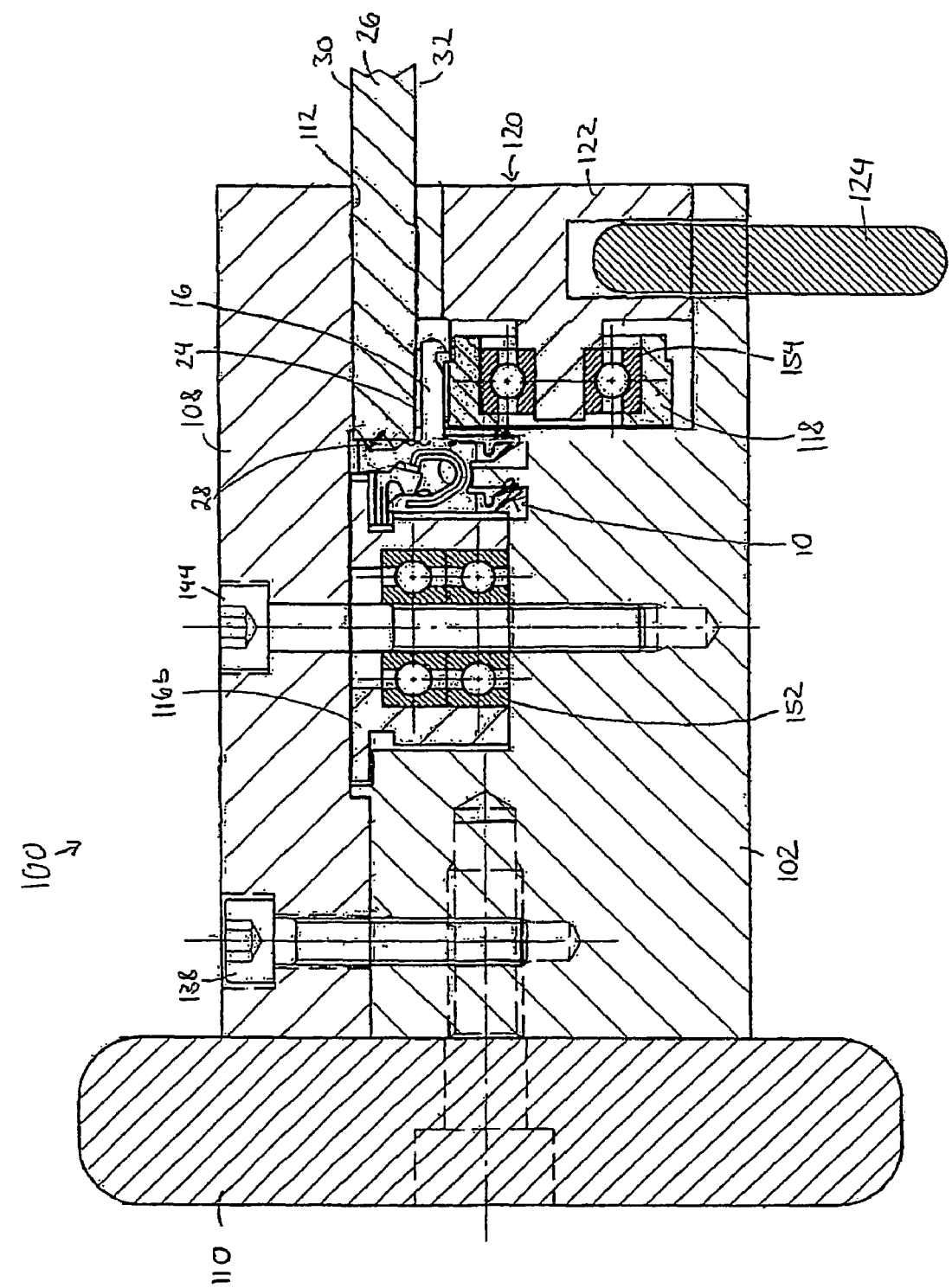
FIG. 9 is a cross section corresponding to FIG. 4, the pressure roll of the fitting head being in the pressing position.

A pressure roll 118 is rotatably mounted on an eccentric mechanism 120 or fastened to a linear adjustment mechanism (not shown) using a ball bearing 154, so it is adjustable between the retracted position shown in FIG. 4 and the pressing position illustrated in FIG. 9. This has the advantage that the distance between the pressure roll 118 (in the retracted position) and the inner surface 32 of the vehicle window is sufficiently large, during insertion of the edge sealing strip 10 into the insertion slot 112 and attachment of the fitting head 100 to the vehicle window 26 in direction A, to allow simple attachment of the fitting head 100 to the rim of the window 26 without the occurrence of undesired premature adhesion between the double-sided adhesive tape 24 on the contact limb 26 of the edge sealing strip 10 and the inner surface 32 of the vehicle window. If the vehicle window 26 and edge sealing strip 10 are correctly positioned in the fitting head, the pressure roller 118 can be adjusted out of the retracted position shown in FIG. 4 into the pressing position illustrated in FIG. 9, in which the pressure roll 118 presses the contact limb of the edge sealing strip 10 and therefore the double-sided adhesive tape 24 against the inner surface 32 of the vehicle window and thus produces adhesion between the edge sealing strip 10 and the vehicle window 26.

As may be seen from FIG. 8, the eccentric mechanism 120 comprises a rotatably mounted eccentric disc 122 which can be adjusted using a lever 124 between two positions in which a ball 128, pressed by a spring 126 against the eccentric disc 122, can be pressed in each case into one of the two recesses 130, 132, thus fixing the eccentric disc in one of two positions. In the position shown in FIG. 8, in which the ball 128 engages with the recess 130, the pressure roll 118 is in the retracted position shown in FIG. 4. If the lever 124 is rotated anticlockwise, the ball 128 engages with the recess 132, thus bringing the pressure roll 118 into the pressing position shown in FIG. 9.

The construction of the fitting head comprising the main part 102 and end part 106 allows in this case simple fitting of the eccentric mechanism 120, as the pressure roll 118 attached to the eccentric disc 122 can be introduced through an opening in the main part 102 and the ball 128 of the spring 126 can be introduced, prior to fitting of the end part 106, through a hole in the main part 102 connected to a blind hole in the end part 106, thus biasing the spring against the base of the blind hole in the end part 106. The separate cover 108 allows simple insertion of the rollers 116a, 116b into blind holes provided in the main part 102 and simpler formation of the insertion slot 112.

When fitting an edge sealing strip 10 according to the invention using the fitting head 100, there is no need to three-dimensionally pre-bend the edge sealing strip 10 in accordance with the contour of the window; rather, it can be pre-bent in a contour produced by projection of the edge contour of the window into a plane drawn close to the perpendicular to the window surface. The (two-dimensionally) pre-bent part is thus located in a flat plane. If appropriate, an edge sealing strip that is not pre-bent at all (i.e. a straight strip) can also be used. This is advantageous for the packaging and transportation of the edge sealing strip, as the profile can be supplied in part, depending on the contour of the window, as a straight part not requiring any special packaging.

During fitting, which can efficiently be carried out directly at the window manufacturer's or during final assembly, the edge sealing strip 10 is initially inserted into the insertion slot 112 in the fitting head 100, the pressure roll 118 being in the retracted position shown in FIG. 4. The fitting head is then attached in direction A to the lower rim of a vehicle window 26 until the narrow side 34 of the vehicle window 26 contacts the main limb 12 of the edge sealing strip 10. If the edge sealing strip 10 and vehicle window 26 are correctly positioned in the fitting head 100, the pressure roll 118 is brought, using the lever 124 of the eccentric mechanism 120, into the pressing position in which it leads, by pressing the contact limb 16 of the edge sealing strip 10 against the inner surface 32 of the vehicle window, to adhesion of the double-sided adhesive tape 24 to the inner surface 32 of the vehicle window.

Finally, the fitting head 100 is moved in the direction of movement B along the rim of the window, so continuous adhesion of the edge sealing strip 10 to the inner surface 32 of the vehicle window is achieved over the entire length of the window rim. The spacer 114 ensures in this case, at the respective run-in end of the fitting head 100, that no undesired adhesion between the contact limb 16 comprising the double-sided adhesive tape 24 and the inner surface of the vehicle window takes place before the pressure roll 118, as the edge sealing strip 10 is not yet correctly positioned in this location with regard to the rim of the window and is not yet three-dimensionally bent in accordance with the rim of the window edge.

During the movement of the fitting head along the rim of the window, the edge sealing strip 10 is necessarily bent along the contour of the window and the exertion of pressure onto the handle 110 allows low-gap or gap-free fitting of the edge sealing strip 10 to the vehicle window 26 to be achieved. As, in the case of the edge sealing strip 10 according to the invention, only low bending forces are required for deformation, on account of the soft metal-like behaviour of said strip, the edge sealing strip 10 can be fitted to the vehicle window 26 manually using the fitting head 100. This is in contrast to the complex fitting of known edge sealing strips which, on account of their rigidity, have to be three-dimensionally pre-bent and cannot be attached manually to the vehicle window.

The invention claimed is:

1. Plastic edge sealing strip (10) for a vehicle window (26), for the lower edge of a motor vehicle windscreen (26), comprising:
    a main limb (12) which can be inserted between a narrow side (34) of the vehicle window (26), which narrow side connects the outer surface (30) and the inner surface (32) of the vehicle window (26), and a connection part,
    a spring limb (14) oriented in substantially the same direction as the main limb (12) which is provided with a clamping force-increasing metal insert (18), wherein at least one detent element (40) of the connection part can be inserted in a locking manner between the spring limb (14) and main limb (12), and
    a contact limb (16) for resting against the inner surface (32) of the vehicle window (26),
wherein the edge sealing strip (10) has, at least in certain regions, filler-reinforced plastics material such that the edge sealing strip (10) is substantially inelastically deformable.

2. Plastic edge sealing strip (10) according to claim 1, wherein the edge sealing strip (10) is substantially inelastically deformable under the forces occurring during fitting of the edge sealing strip (10) to a vehicle window (26).

3. Plastic edge sealing strip (10) according to claim 1, wherein the filler is fibrous or platelike.

4. Plastic edge sealing strip (10) according to claim 1, wherein the proportion by weight of the filler is between 10 and 40%.

5. Plastic edge sealing strip (10) according to claim 1, wherein the filler-reinforced plastics material is formed from a thermoplastic.

6. Plastic edge sealing strip (10) according to claim 1, wherein the plastics material of the edge sealing strip (10) is, at least in certain regions, half-hard, having a Shore (A) hardness of 70 to a Shore (D) hardness of 75.

7. Plastic edge sealing strip (10) according to claim 1, wherein the clamping force-increasing metal insert (18) comprises a roll-deformed aluminum or steel profile.

8. Plastic edge sealing strip (10) according to claim 1, wherein the clamping force-increasing metal insert (18) is formed from an at least approximately U-shaped profile having two legs connecting the spring limb (14) to the main limb (12), the first leg of the U-shaped profile ending within said spring limb (14), the second leg ending within said main limb (12), so the contact limb (16) is constructed substantially without the clamping force-increasing metal insert (18).

9. Plastic edge sealing strip (10) according to claim 1, wherein the contact limb (16) is constructed, at least over a portion of the length of the edge sealing strip, with material weakenings.

10. Plastic edge sealing strip (10) according to claim 1, wherein the contact limb (16) is provided, on its side remote from the vehicle window, with at least one, substantially hook-shaped, moulding (38) for positive connection to a curable window adhesive (50) on the inner surface (32) of the vehicle window (26).

11. Plastic edge sealing strip (10) according to claim 1, for a multilayered vehicle window (26), wherein a bead-like window perimeter adhesive (28) is attached to the main limb (12) on the side of the vehicle window for adhesive connection to the narrow side (34), guided up to the bead, of the vehicle window (26), the window perimeter adhesive (28) comprising a non-curing, permanently adhering contact hot-melt adhesive.

12. Plastic edge sealing strip (10) according to claim 11, wherein the window perimeter adhesive (28) is provided toward the outer surface of the vehicle window with a covering (36).

13. Plastic edge sealing strip (10) according to claim 1, wherein a detent element adhesive (44) is provided in the region between the spring limb (14) and main limb (12).

14. Plastic edge sealing strip (10) according to claim 1, wherein on at least one of the spring limb (14) and the main limb (12) there is provided a plastic knob (42) for detachably fixing the inserted detent element (40) of the connection part.

15. Fitting head (100) for attaching a plastic edge sealing strip (10), to the lower edge of a motor vehicle windscreen (26), comprising:
a main limb (12) which can be inserted between a narrow side (34) of the vehicle window (26), which narrow side connects the outer surface (30) and the inner surface (32) of the vehicle window (26), and a connection part,
a spring limb (14) oriented in substantially the same direction as the main limb (12) which is provided with a clamping force-increasing metal insert (18), wherein at least one detent element (40) of the connection part can be inserted in a locking manner between the spring limb (14) and main limb (12), and
a contact limb (16) for resting against the inner surface (32) of the vehicle window (26),
an insertion slot (112) for the edge sealing strip (10),
a spacer (114) in the region of the edge sealing strip insertion side of the insertion slot, to hold a contact limb, provided with a window adhesive (24), of the edge sealing strip (10) at a distance from an inner surface (32) of the vehicle window (26), and
a pressing means (118), following the spacer (114), for pressing the contact limb (16) against the inner surface (32) of the vehicle window (26) in a pressing position of the pressing means (118),
wherein the edge sealing strip (10) has, at least in certain regions, filler-reinforced plastics material such that the edge sealing strip (10) is substantially inelastically deformable, and the insertion slot (112) also receives an edge region of the vehicle window (26) and in that the pressing means (118) comprises a pressure roll (118) which is resiliently mounted so as to be biased into the pressing position.

16. Fitting head (100) according to claim 15, wherein the pressing means (118) is adjustable between the pressing position and a retracted position.

17. Fitting head (100) according to claim 15, wherein the pressure roll (118) is rotatably mounted on an eccentric part (120) or is fastened to a linear adjustment mechanism.

18. Fitting head (100) according to claim 17 wherein the eccentric part (120) or the linear adjustment mechanism is provided with a hand lever (124).

19. Fitting head (100) according to claim 15, wherein the pressure roll (118) is formed from resilient material.

20. Fitting head (100) according to claim 15, characterised by at least one roller for resting against the outside, remote from the vehicle window (26), of the edge sealing strip (10).

21. Fitting head (100) according to claim 15, characterised by a handle part (110) that is remote from the insertion slot (112).

22. Plastic edge sealing strip (10) for a vehicle window (26), for the lower edge of a motor vehicle windscreen (26), comprising:
a main limb (12) which can be inserted between a narrow side (34) of the vehicle window (26), which narrow side connects the outer surface (3) and the inner surface (32) of the vehicle window (26), and a connection part;
a spring limb (14) oriented in substantially the same direction as the main limb (12) which is provided with a clamping force-increasing metal insert (18), wherein at least one detent element (40) of the connection part can be inserted in a locking manner between the spring limb (14) and the main limb (12); and
a contact limb (16) for resting against the inner surface (32) of the vehicle window (26);
wherein the edge sealing strip (1) has, at least in certain regions, half-hard plastics material provided with fibers as filler material mainly oriented in a longitudinal direction of said sealing strip (10) such that the edge sealing strip (10) is substantially inelastically deformable.

23. Plastic edge sealing strip (10) for a vehicle window (26) to be clamped to a connection part in engagement with the vehicle window (26), comprising:
half-hard plastics material provided with fibers as filler material mainly oriented in a longitudinal direction of said sealing strip (10) such that the edge sealing strip (10) is substantially inelastically deformable;
a clamping force-increasing metal insert (18) embedded in said plastics material; and
a contact limb (16) for resting against a surface (32) of the vehicle window (26).

24. Plastic edge sealing strip (10) for a vehicle window (26) to be clamped to a connection part in engagement with the vehicle window (26), comprising:

half-hard plastics material provided with filler material such that the edge sealing strip (10) is substantially inelastically deformable;

a clamping force-increasing metal inset (18) embedded in said plastics material; and a contact limb (16) for resting against a surface (32) of the vehicle window (26).

\* \* \* \* \*